Aug. 10, 1937.  H. S. GORDON  2,089,356
CAR SEAT BASE
Filed March 24, 1931  2 Sheets-Sheet 2

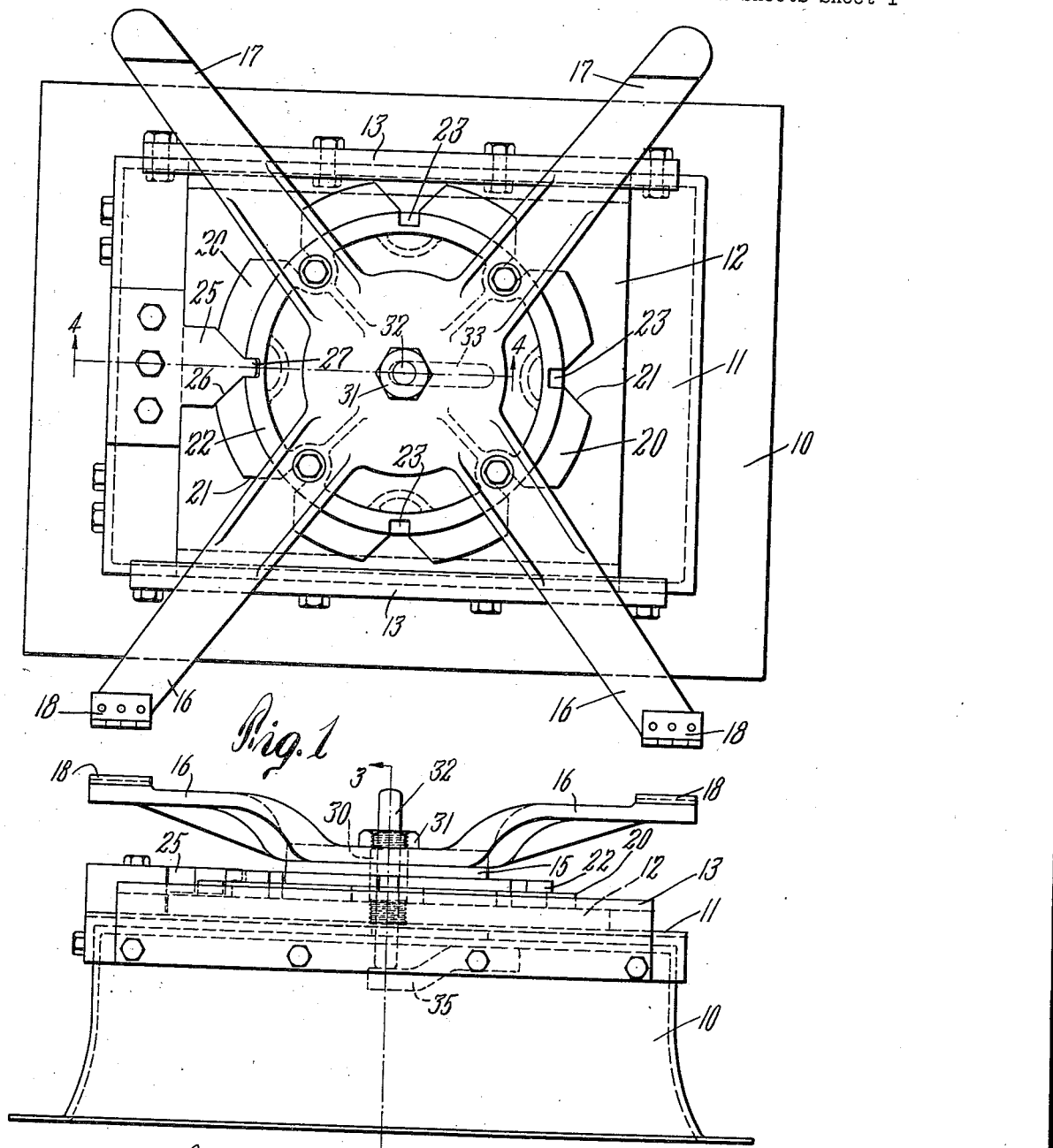

Inventor:
Harry S. Gordon.
by Wright, Brown, Quinby & May
Attys.

Patented Aug. 10, 1937

2,089,356

UNITED STATES PATENT OFFICE 2,089,356

CAR SEAT BASE

Harry S. Gordon, Wakefield, Mass., assignor to Heywood-Wakefield Company, Boston, Mass., a corporation of Massachusetts Application March 24, 1931, Serial No. 524,802

8 Claims. (Cl. 155—96)

This invention relates to a car seat base adapted for use in railway coaches, passenger busses, and any other places where it may be desired to swing the seat to face in any one of a number of directions. It is an object of the invention to supply a base which will permit the location of the seat close to the wall of the car or vehicle without interference with the rotation of the seat by engagement of a corner of the seat with the wall. According to the invention, the seat may be locked in any one of a number of different angular positions, the seat being unlocked by lateral movement of its axis from its normal position. According to the invention this lateral unlocking movement also results in a tilting forward of the seat which also reduces the diameter of the turning circle of the seat, this turning circle being the determining factor in the location of the seat with reference to the adjacent side wall of the vehicle and also with reference to the next adjacent seats on the same side of the vehicle. The lateral movement of the seat from the side wall provides clearance so that the corners of the seat do not hit the wall when the seat is rotated. The forward tilting of the seat causes the seat to avoid interference with the next adjacent seat, and thus permits closer spacing between the seats. This matter of saving inches in a car or bus is of great importance, not only as to the seating capacity of the car, but also as to the comfort of the passengers. Since the lateral movement of the seat, according to one embodiment of the invention, is necessarily accompanied by a tilting of the seat against gravity, the weight of the seat and any load which may be thereupon may be utilized to hold the seat in its locked position, so that accidental unlocking of the seat for rotative movement is thus prevented.

Other advantageous features will be apparent to one skilled in the art from the disclosure of the invention in the description thereof which follows and on the drawings, of which,—

Figure 1 is a plan view of a seat base embodying the invention.

Figure 2 is a front elevation of the same.

Figure 3:
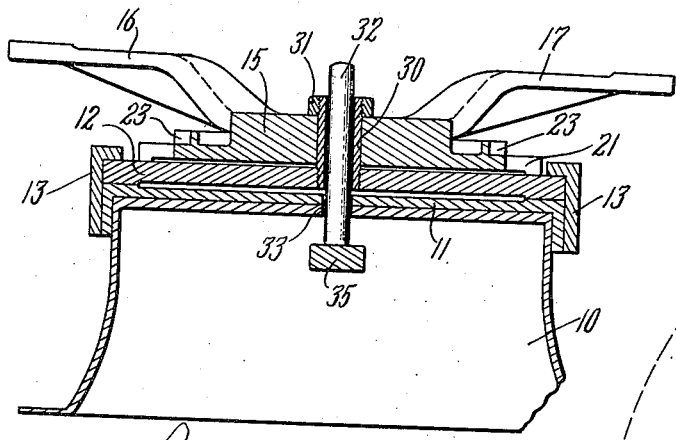
Figure 3 is a section on the line 3—3 of Figure 2.

The seat base illustrated on the drawings may comprise a pedestal 10 which, as shown, may be of general rectangular form and of suitable height. This pedestal includes a flat top 11 which may be reinforced as shown. On this top a rectangular plate 12 is slidably mounted between a pair of guide rails 13. Rotatably mounted on the plate 12 is a seat support which may include a hub portion 15 from which extend four supporting arms, two of these arms 16 extending forwardly and two arms 17 extending rearwardly. The forward arms 16 are provided with suitable hinges 18 at their extremities by which a seat 19 is secured to the support, the rear portion of the seat simply resting on the extremities of the arms 17. Thus the seat may readily be titled forward on the hinges 18. The hub portion 15 of the seat support may have a flange 20 extending radially therefrom so as to form a disk which is coaxial with the axis of rotation of the support. This disk is notched as at 21 in its peripheral edge, the notches 21 being angularly spaced from each other as desired. As shown on the drawings the notches are located at intervals of 45° around the periphery of the disk. Within the contour of the disk is an upstanding annular rib 22, the peripheral surface of which is likewise notched as at 23, the notches 23 registering with corresponding notches 21.

Mounted at one end of the pedestal 10 is a locking lug 25 which, as shown, has converging side portions as at 26 terminating in a nose 27. The sides of the notches 21 also converge, the notches being formed to receive and to be fitted by the tapering portion of the lug 25. When the tapered portion of the lug 25 enters a notch 21, the nose 27 at the same time enters and fits the corresponding notch 23 in the rib 22. The purpose of the lug 25 is to lock the seat support and the seat thereon against rotation. In order to release the seat support for rotation, it must be moved laterally with the slide 12 away from the locking lug 25 so that the latter can clear the notches 21 and 23, whereupon the seat may be turned to any desired angular position and may be locked in such position if there is a corresponding notch located in the disk 20. Thus, in the case of the seat base illustrated in Figure 1, the seat may be locked in a position facing forwardly or rearwardly in the car, or facing directly toward or away from the aisle, or at an angle half way between any of these four positions. The lateral movement of the seat and support away from the lug 25 provides clearance for the corners of the seat to clear the wall when the seat is swung around on its pivot. Thus the base may be fixed nearer to the side wall of the car than would be possible if the lateral motion of the seat away from the wall of the car were not provided for.

Figure 4:
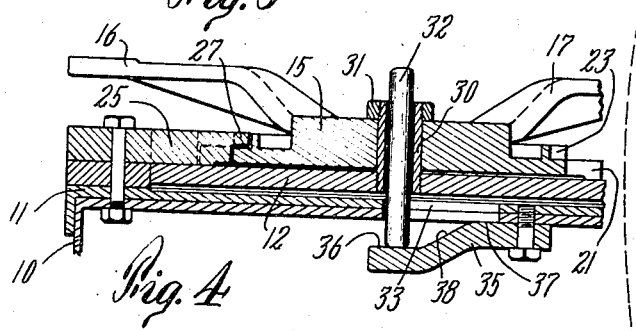
Figure 4 is a fragmentary section on the line 4—4 of Figure 1.
Figure 5:
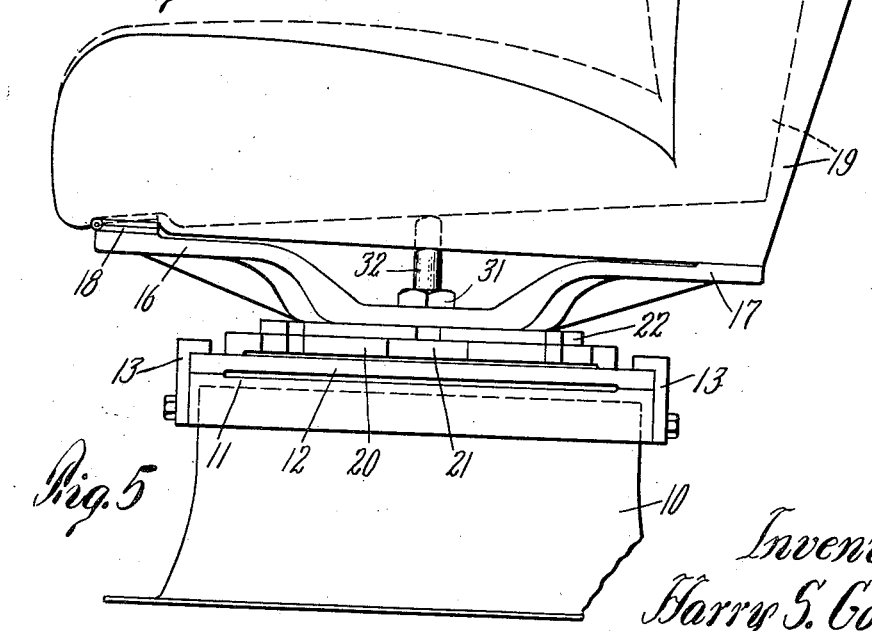
Figure 5 is an end elevation of a seat base embodying the invention, showing a seat mounted thereon.

It is desirable that accidental rotation of the seat be prevented and consequently that accidental unlocking movement of the seat also be prevented. To this end the weight of the seat base and any load which may be thereon is utilized as follows. A vertical tube 30 is mounted on the plate 12 as a bearing member for the rotation of the seat support on the plate 12, and extends upwardly therefrom, the hub portion 15 of the seat support being centrally perforated to fit over this bearing tube 30 and to rotate thereabout. A nut 31 may be provided to hold the seat support down against the plate 12 and a loose plunger 32 extends slidably through the tube 30 and through a slot 33 in the top 11 of the pedestal. This plunger 32 is thus slidable vertically with respect to the plate 12, but is constrained to move laterally with the plate when the latter slides in the guides 13. The lower end of the plunger 32 rests upon a cam member 35 which may be supported on the under face of the pedestal top 11. As shown in Figure 4, the upper face of the cam member 35 has a lower surface portion 36, an upper surface portion 37, and an intermediate surface portion 38 between the lower and upper surface portions, the intermediate portion being sloped. The plunger 32 normally rests on the lower surface 36 when the plate is in its normal position of rest and the seat support is locked by engagement with the locking lug 25. When the plate 12 is moved away from the locking lug 25, the lower end of the plunger 32 rides on the sloping surface 38 forcing the plunger to slide upwardly through the tube 30. As shown in Figure 5, the bottom of the seat 19 rests not only on the arms 17 but also on the upper end of the plunger 32 so that when the plunger is forced upwardly, the seat 19 is rocked forwardly on its hinges 18. The motion of the plate 12 from its normal position is thus against the gravitational forces acting on the seat 19 and upon any load which may be resting on the seat. Thus the seat by its own weight and by the weight of a passenger or passengers which may be sitting thereon, prevents the accidental unlocking of the seat support to permit the rotation of the same. This structure also has the advantage of causing a simultaneous forward tilting of the seat when it is moved laterally to unlock the support for rotation. Just as the lateral movement of the seat provides more clearance for the corners of the seat when the seat is swung on its pivot, so the tilting of the seat provides more clearance between the seat back and the backs of the adjacent seats. This permits location of the seats nearer to each other than would be possible without the tilting. Thus unlocking movement of the seat simultaneously provides clearance with respect to the side wall of the car and also with respect to adjacent seats. When the seat has been swung to the desired angle, it is pushed so as to move the slide 12 back toward its normal position. The converging sides 26 of the lug 25 engage the corresponding sides of the adjacent notch 21 to guide the locking lug into correct position in the notch and to cause the nose 27 to register with and to enter the corresponding slot 23. Thus the seat is securely locked against rotation until it is manually drawn in a direction away from the wall of the car and against the gravitational forces acting on the seat, to permit the further rotation of the seat.

I claim:

1. A car seat base comprising a pedestal, a seat support rotatable and horizontally movable on said pedestal, means for locking said support against rotation, said locking means being releasable by lateral movement of said support, and means operating to lift the weight of a seat on said support relatively thereto when said support is moved horizontally in a direction to release said locking means.

2. A car seat base comprising a pedestal, a plate slidably mounted on said pedestal, a seat support rotatably mounted on said plate and including a circular portion having notches in its periphery, a locking lug fixed on said pedestal and adapted to enter any one of said notches presented thereto to lock said support against rotation and to be disengaged from said support by movement of said plate and support away therefrom, and means operating to lift the weight of a seat on said support when the support is moved in a direction to release said locking means.

3. A car seat base comprising a pedestal, a non-rotatable plate horizontally slidable on said pedestal, a seat support rotatably mounted on said plate, means releasable by lateral movement of said plate in its plane for locking said support against rotation, a seat mounted on said support, and means actuable by lateral movement of said plate for tilting said seat against gravity.

4. A car seat base comprising a pedestal, a plate laterally slidable on said pedestal, a seat support on said plate and rotatable relatively thereto, a cam member beneath said plate and having a sloping upper face portion, and a vertical plunger resting on the upper face of said cam, said plunger extending through said plate and laterally movable therewith, whereby lateral movement of said plate moves said plunger onto the sloping face portion of said cam and causes said plunger to move upwardly.

5. A car seat base comprising a pedestal, a pair of guide rails on said pedestal, a plate slidable between said guide rails, a seat support rotatably mounted on said plate, said support including a circular portion coaxial with the axis of rotation of said support and provided with peripheral notches, a locking lug mounted on said pedestal and adapted to enter any of said notches to limit movement of said plate in one direction and to lock said support against rotation in either direction, and means maintaining said plate in locking position, said last-mentioned means including a fixed cam member having an upper surface with a lower portion, a higher portion, and a sloping intermediate portion, and a slidable plunger projecting vertically through said plate and laterally movable with said plate, the lower end of said plunger riding on said cam surface and resting on said lower portion when the plate is in its locking position.

6. A car seat base comprising a pedestal and a seat support rotatable and laterally movable on said pedestal, in combination with a seat hingedly mounted adjacent to its front edge on said support, said combination including means releasable by lateral movement of said plate normally locking said support and seat against rotation, and means actuable by unlocking movement of said support to tilt said seat on its hinges.

7. A car seat comprising a pedestal, a seat support rotatable on said pedestal and also laterally movable thereon without rotation, means for locking said seat support against rotation when its axis of rotation is in a predetermined position relative to said pedestal, and means actuable by lateral motion of said support from its locked position to tilt a seat mounted thereon.

8. A car seat base comprising a flat-topped pedestal, a pair of guide flanges extending along opposite sides of said pedestal, a rectangular plate slidable on said pedestal between said guides, a hollow post rising centrally from said plate, a seat support including a disk bearing directly on said plate and rotatable about said post, said disk being provided with peripheral notches, a locking lug mounted on said pedestal and adapted to engage in any of said notches to lock said disk against rotation in either direction, a seat hinged to said support, and means actuable by movement of said plate on said pedestal to tilt said seat, said seat-tilting means including a cam member below said plate, a plunger extending through said hollow post and bearing at one end on said cam member and at the other end against a portion of said seat.

HARRY S. GORDON.